UNITED STATES PATENT OFFICE.

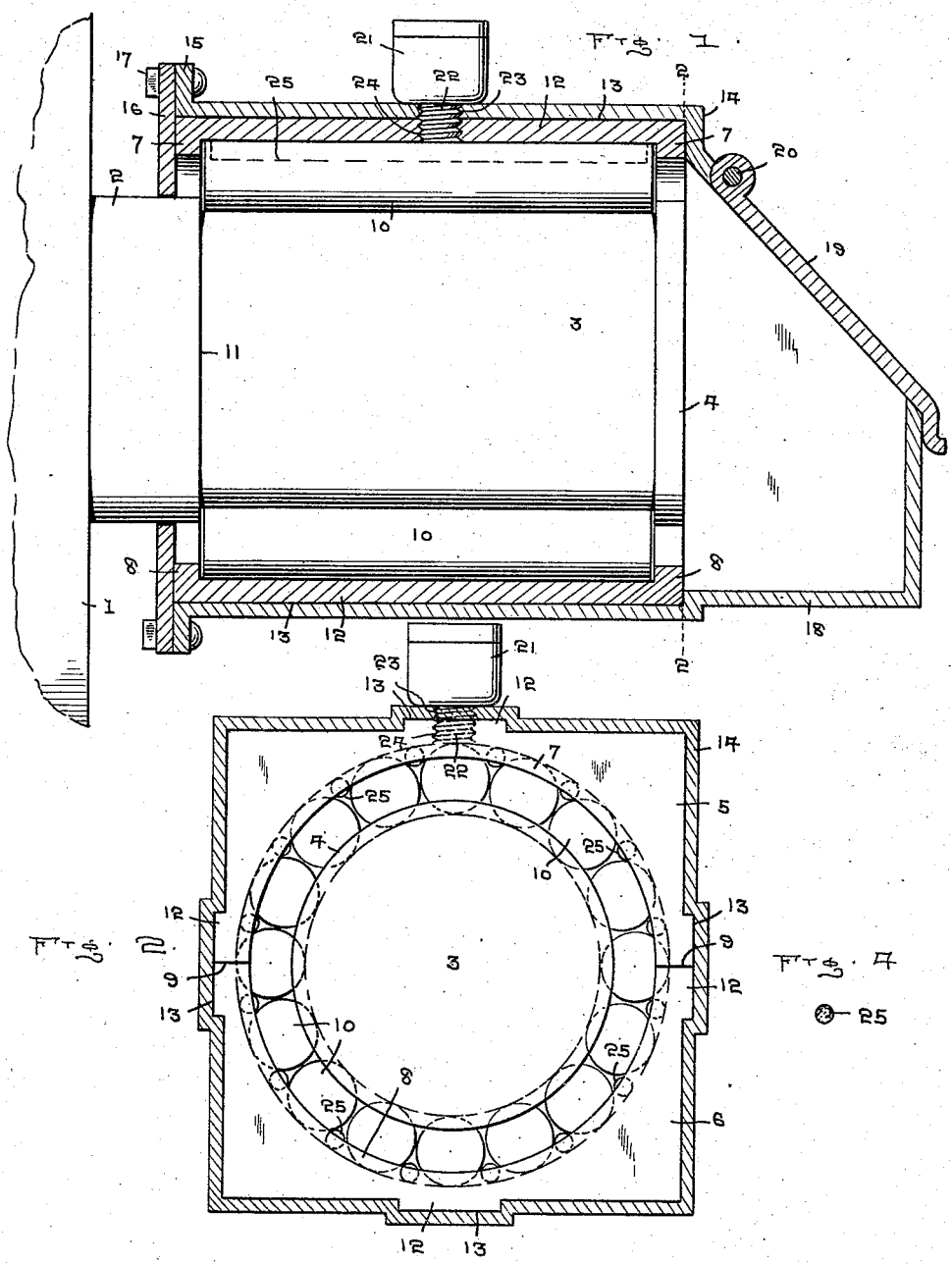

FORREST F. MICHENER, OF NOBLESVILLE, INDIANA.

ROLLER-BEARING.

1,183,895.  Specification of Letters Patent.  Patented May 23, 1916.

Application filed October 1, 1915. Serial No. 53,663.

*To all whom it may concern:*

Be it known that I, FORREST F. MICHENER, a citizen of the United States, residing at Noblesville, in the county of Hamilton and State of Indiana, have invented certain new and useful Improvements in Roller-Bearings; and I do hereby declare the following to be a full, clear, and exact description of the invention, such as will enable others skilled in the art to which it appertains to make and use the same.

This invention relates to roller bearings and more particularly to roller bearings for car wheels.

One of the objects of this invention is to provide a roller bearing consisting of few parts, and which can be readily applied to any of the journal boxes now in use.

Another object of this invention is to provide the roller bearing with means for assuring the perfect lubrication of the roller bearing in addition to the ordinary means of lubrication.

Another object of this invention is to provide the roller bearing with a plurality of absorbent agents for more efficiently lubricating the roller bearing.

Other objects and advantages will be hereinafter more clearly set forth in the specification, defined in the claims, and illustrated in the accompanying drawings, in which, Figure 1 is a vertical longitudinal sectional view of the invention showing the same as applied to the axle or journal of a car wheel. Fig. 2 is a vertical transverse sectional view on line 2—2 of Fig. 1 showing the detail construction of the invention. Fig. 3 is a side view of one of the hygroscopic agents employed. Fig. 4 is an end view of the structure shown in Fig. 3.

Referring to the drawings, 1 denotes a fragmentary portion of a car wheel, 2 the axle, 3 the reduced portion or journal of the axle, and 4 the annular retaining flange or head upon the end of the journal 3.

Surrounding the journal 3 are the bearing blocks 5 and 6, provided at each of their ends with the inwardly directed retaining flanges 7, 7 and 8, 8 respectively, so that, when the bearing blocks 5 and 6 are assembled together with their edges meeting as at 9, 9 the interior of the blocks 5 and 6 form a circular bearing surface, and their flanges 7 and 8 form continuous retaining flanges. The distances between the flanges 7 of the block 5, and the flanges 8 of the block 6 are substantially the same distance as the longitudinal length of the reduced portion or journal 3 of the axle 2, but the interior diameter of the conjoint bearing blocks 5 and 6 is greater than the diameter of the journal 3 of the axle 2, and interposed between the journal 3 and the bearing blocks 5 and 6 are a plurality of rollers or roller bearings 10. The rollers 10 are of a length slightly less than the distance betwen the flanges 7 and 8 of the blocks 5 and 6, and the length of the journal 3 between the head 4 and the shoulder 11 at the opposite end of the journal 3. The rollers 10 are retained in operative position and prevented from longitudinal displacement by the flanges 7 and 8 of the bearing blocks 5 and 6, and the head 4 and shoulder 11 of the journal 3.

The bearing blocks 5 and 6 are provided upon their outer sides with the longitudinally disposed ribs 12 adapted to be engaged by corresponding channels 13 formed in the inner side walls of the boxing 14, adapted to surround the bearing blocks 5 and 6 and secured therearound by the flange 15, formed upon the inner end of the boxing 14, being secured to the dust guard and retaining plate 16 through the medium of the bolts 17. The boxing 14 is further provided with the packing or stuffing box 18 provided with the lid 19, hinged to the boxing 14 as at 20. The packing or stuffing box 18 contains the usual cotton waste and lubricant for lubricating the journal and roller bearings.

For additionally lubricating the journal and roller bearings at the top of the journal box is provided the oil cup or grease cup 21. This cup is provided with the screw threaded hollow stem 22, which is threaded through the screw threaded aperture 23 formed centrally in the top of the boxing 14, and also through the screw threaded aperture 24 formed in the block 5 and registering with the aperture 23, whereby the stem 22 of the oil or grease cup 21 communicates with the interior of the bearing block 5 for supplying an additional lubricant to the journal and its bearings.

Interposed between the opposing peripheral faces of the pairs of rollers 10 and the inner surfaces of the bearing blocks 5 and 6 are the lubricating rollers 25. These lubricating rollers 25 are formed of a suitable fibrous substance of a sufficiently absorbent nature to absorb and contain a suitable quantity of the lubricant, so that, when the bearing rollers 10 revolve and travel around their course, the lubricating rollers 25 will likewise revolve and travel with the bearing rollers 10, thus receiving a fresh supply of a lubricant from both the lower portion and the upper portion of the journal box and convey the lubricant to the intermediate points between the points of supply, whereby the lubricant is uniformly distributed to all points of the bearing.

While I have here shown and described my invention as applied to a car wheel journal box, I desire it to be understood that I do not limit my invention to this specific use as the same is equally adaptable to all kinds of bearings, such as engine bearings, the bearings for power shafting, and other bearings wherein roller bearings are used.

Having described my invention, what I claim as new and desire to secure by Letters-Patent, is:—

1. In a roller bearing, the combination with a journal, of bearing blocks for said journal, a boxing for encompassing said journal and said bearing blocks, roller bearings interposed between said journal and said bearing blocks, means for supplying a lubricant to said bearing, auxiliary means for supplying an additional lubricant to said bearing, and absorbent members interposed between the opposed faces of said rollers adjacent said bearing blocks for distributing said lubricants uniformly throughout the bearing.

2. In a roller bearing, the combination with a journal, of bearing blocks for said journal, a boxing for encompassing said journal and said bearing blocks, ribs upon the exterior surfaces of said bearing blocks, said boxing having channels formed therein for engaging said ribs of said bearing blocks, a flange upon one end of said boxing, a retaining plate secured to said flange, bearing rollers interposed between said journal and said bearing blocks, means upon said journal and said bearing blocks for preventing the displacement of said bearing rollers, a stuffing box at the opposite end of said boxing for supplying a lubricant at the bottom of said bearing, a lubricating cup for additionally supplying a lubricant at the top of said bearing, and lubricating rollers formed of absorbent material interposed between the opposing faces of said bearing rollers adjacent the inner surfaces of said bearing blocks for collecting and distributing said lubricants uniformly throughout the surfaces of said journal, said bearing rollers, and said bearing blocks.

In testimony whereof I have signed my name to this specification in the presence of two subscribing witnesses.

FORREST F. MICHENER.

Witnesses:
NELLIE R. HINSHAW,
CHESTER F. BAILEY.

Copies of this patent may be obtained for five cents each, by addressing the "Commissioner of Patents, Washington, D. C."